(12) United States Patent
Gonzalez Quinones et al.

(10) Patent No.: US 8,939,770 B2
(45) Date of Patent: Jan. 27, 2015

(54) MATERNAL SIMULATOR

(75) Inventors: Paulina Gonzalez Quinones, Stavanger (NO); Tor Inge Garvik, Stavanger (NO); Lise Lørup, Hafrsfjord (NO); Jens Petter Ianke, Sola (NO)

(73) Assignee: Laerdal Medical AS, Stavanger (NO)

( * ) Notice: Subject to any disclaimer, the term of this patent is extended or adjusted under 35 U.S.C. 154(b) by 0 days.

(21) Appl. No.: 13/501,343

(22) PCT Filed: Dec. 17, 2010

(86) PCT No.: PCT/EP2010/070116
§ 371 (c)(1),
(2), (4) Date: Apr. 11, 2012

(87) PCT Pub. No.: WO2011/073407
PCT Pub. Date: Jun. 23, 2011

(65) Prior Publication Data
US 2012/0202181 A1  Aug. 9, 2012

(30) Foreign Application Priority Data

Dec. 17, 2009  (NO) .................................... 20093550
Jan. 28, 2010  (NO) .................................... 20100139

(51) Int. Cl.
G09B 23/28 (2006.01)
(52) U.S. Cl.
CPC ................................... G09B 23/281 (2013.01)
USPC ....................................................... 434/273
(58) Field of Classification Search
USPC ........................................................ 434/273
See application file for complete search history.

(56) References Cited

U.S. PATENT DOCUMENTS

| | | |
|---|---|---|
| 2,495,568 A | 1/1950 | Coel |
| 3,797,130 A | 3/1974 | Knapp et al. |
| 3,822,486 A | 7/1974 | Knapp et al. |
| 3,826,019 A | 7/1974 | Knapp et al. |
| 3,921,311 A | 11/1975 | Beasley et al. |
| 5,104,328 A | 4/1992 | Lounsbury |
| 5,472,345 A | 12/1995 | Eggert |
| 2004/0214150 A1 | 10/2004 | Eggert et al. |

(Continued)

FOREIGN PATENT DOCUMENTS

| | | |
|---|---|---|
| CN | 201004286 Y | 1/2008 |
| DE | 10202504 A1 | 7/2003 |

(Continued)

OTHER PUBLICATIONS

Beauce, Gaetan, "International Search Report" for PCT/EP2010/070116, as mailed Feb. 21, 2011, 3 pages.

*Primary Examiner* — Kesha Frisby
(74) *Attorney, Agent, or Firm* — Winstead PC

(57) ABSTRACT

Device for simulating birth and birth related complications, the device being adapted to be attached to a real human being 5 and having an outer skin 1 with a simulated vaginal opening 6, said opening being adapted to be situated adjacent the lower part of the person 5, further having a simulated uterus 18 adapted to contain a foetus manikin 29, said uterus 18 having an opening 20 coinciding with the vaginal opening 6 of the outer skin 1, said uterus 18 further a uterus simulator 51 for simulating uterus conditions between a simulated atonic state and a simulated contracted state, and further comprising a first conveyor 27 for conveying simulated blood from a blood container 33 to the simulated vaginal opening 6, when the simulated uterus 53 is in the atonic state.

20 Claims, 19 Drawing Sheets

(56) References Cited

U.S. PATENT DOCUMENTS

| | | |
|---|---|---|
| 2005/0014115 A1 | 1/2005 | Riener et al. |
| 2006/0073456 A1 | 4/2006 | Allen et al. |
| 2007/0105083 A1 | 5/2007 | Riener et al. |
| 2008/0138779 A1 | 6/2008 | Eggert et al. |
| 2008/0138780 A1 | 6/2008 | Eggert et al. |
| 2009/0298035 A1 | 12/2009 | Lynch |
| 2010/0086906 A1 * | 4/2010 | Allen et al. .................. 434/273 |

FOREIGN PATENT DOCUMENTS

| | | |
|---|---|---|
| JP | 2004077562 A | 3/2004 |
| WO | WO-0201536 A1 | 1/2002 |
| WO | WO-03041034 A1 | 5/2003 |
| WO | WO-2008042931 A1 | 4/2008 |

* cited by examiner

MATERNAL SIMULATOR

TECHNICAL FIELD

The following invention relates to a teaching device for simulating pregnancy, birth and birth related complications.

BACKGROUND ART

The risk for death of mother as well as newborn varies dramatically between the developed and the developing countries. WHO estimates that over 98% of maternal and infant deaths occur in the developing countries. Over half of these deaths occur when deliveries take place in the home without health care personnel present. But also when deliveries take place in health care institutions, maternal and death rates are more than 10 times higher in developing countries.

One main reason for this is that there are too few birth attendants available and that many of these have not been adequately trained to handle obstetric or newborn emergency cases. The invention described herein aims at addressing this problem.

The causes for these deaths are in many cases related to conditions that could have been easily avoided or remedied. It has been experienced that the death rate can be substantially lowered if the midwife or other persons helping the mother and newborn is given some basic training in handling the most usual complications that can occur. It is also a great advantage if the simulator also can be used for building awareness and knowledge for a mother as preparation in advance of the birth.

In order to facilitate training many devices have been suggested that provides a more or less realistic situation to the medical personnel. Among these are the following: WO03041034, U.S. Pat. No. 5,472,345, U.S. Pat. No. 3,822,486, US2007105083, US2005014115, DE10202504, WO0201536, U.S. Pat. No. 3,826,019, U.S. Pat. No. 2,495,568, U.S. Pat. No. 3,797,130, U.S. Pat. No. 3,921,311, U.S. Pat. No. 5,104,328, US2006073456, US2004214150, WO2008042931, US2008138779, US2008138780.

The above devices are generally too complicated to be used under primitive conditions in a developing country, most of them even requiring electricity to work.

Newly developed training device is shown in US 20090298035. This device has the advantage of being simple and easy to use. It can be put on a person acting as the expecting mother like a pair of trousers. The "mother" then puts a foetus manikin into a doll-containing portion, i.e. a pocket, the trousers and pushes it out through a hole simulating the vagina.

Although, this device is very simple to use and appropriate for low resource settings, it does not sufficiently support training for basic and more advanced situations and interventions relevant during the three stages of birth. It is also not possible to simulate a number of usual complications after the delivery.

SUMMARY OF INVENTION

It is therefore an object of the present invention to provide a device for simulating pregnancy, birth and complications relating to birth, which can be attached to a person acting as the mother. It is also envisaged that the person acting as the mother will be controlling the simulation and act as the instructor. The device is intended to serve as a general birth simulator that can support the relevant situations and interventions where assistance is needed during birth.

The simulator is therefore designed with a simulated uterus from which a baby manikin can be delivered.

In a preferred embodiment the uterus will have at least two states; atonic and contracted. This is preferably achieved having an inflatable part simulating the contracted uterus, but may also be achieved by pulling ropes that acts to fold the uterus from big and soft to small and compact. The skin could have an indication for a navel, since this is a landmark when it comes to assessing uterine contraction.

With the simulator of the present invention it is an object to be able to simulate various conditions connected to birth, both relating to the mother and the child. The foetus/baby manikin is a simulator in itself. The simulator of the present invention therefore enables training on the care of two patients at the same time and can be an important tool in the work to fulfil the UN millennium goals; No. 4—to reduce child mortality— and No. 5—to reduce maternal mortality. It will make it easier for health workers to see the connection between child health and maternal health.

The foetus manikin comprises a plastic foil material that is shaped to enclose a water tight compartment. By filling the compartment with water or possibly another liquid, such as oil, the foetus manikin will get approximately the same weight as a real human foetus.

With the simulator it is inter alia possible to simulate one or more of the following situations and interventions:
- Normal delivery
- Breech delivery
- Incomplete placenta
- Atonic uterus
- Eclampsia
- Trapped placenta
- Retained placenta
- Placenta previa
- Placenta abruptio
- Breech delivery with trapped head
- Shoulder dystocia
- Malpresentation
- Heavy bleeding
- Delayed bleeding
- Constant checks of the uterus condition
- Massage for uterine contraction
- Controlled cord tractions
- Manual removal of placenta
- Frequent assessment of bleeding
- Estimation of blood loss
- IV drip
- Massive volume resuscitation
- Bimanual compression
- Balloon tamponade
- Aortic compression It is a further object of the present invention that the instructor can control one or more of the following parameters:
- Acting—talking, expressing feelings, pain etc
- Bleeding—amount and nature
- Uterus condition
- Fetal heart sounds
- Position of the foetus
- Progress of the birth The simulator of the present invention may also have a number of other advantages compared to the devices mentioned above:
- Improved integration of communication between health worker and mother in the simulation.
- Easy preparations and clean up
- Low maintenance needs

BRIEF DESCRIPTION OF DRAWINGS

These and other aspects of the invention will be apparent from the following detailed description of a preferred embodiment of the invention, described under reference to the drawings, in which.

DETAILED DESCRIPTION OF THE INVENTION

Figure 1:
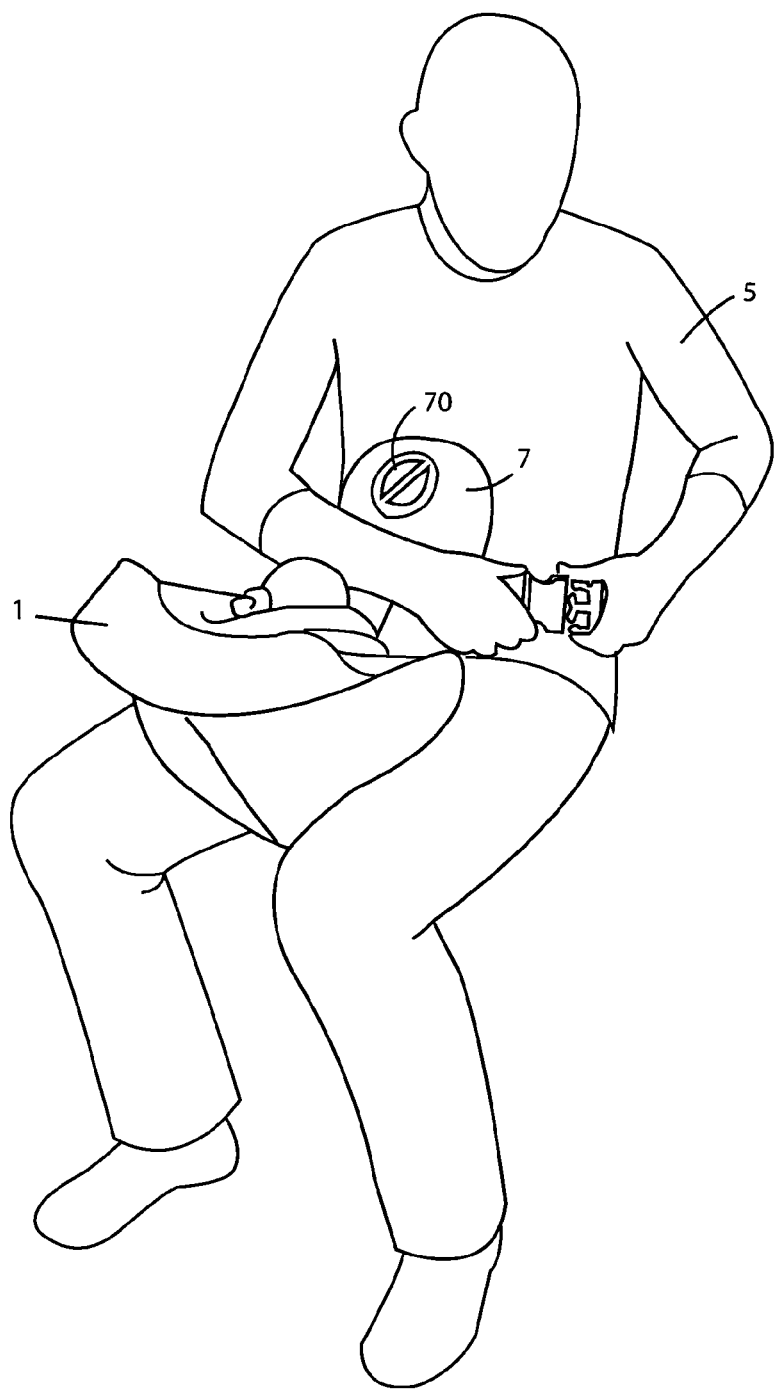
FIG. 1 shows a maternal simulator of the present invention about to be attached to a person acting as the mother/instructor.

When in the following orientation or position terms are used, this refers to the device in an intended position of use.

For simplicity, in the following description the parts of the device of the invention simulating human body parts and organs will sometimes be referred to by the name of that body part or organ.

In FIGS. 1-4 a device according to the invention for simulating birth and maternal complications is shown. It comprises a simulated skin (hereinafter called skin) 1, to which is attached a waist strap 2 to be placed around the instructor 5 who acts as the expecting mother.

The skin 2 will extend over a substantially part of the front of the instructor/mother 5. Between the legs of the mother 5 there will be a space for simulated internal organs, which will be explained in the following.

The skin 1 has a convex shape near the thigh and extends party between the thighs of the mother 5. In this area the skin 1 has an opening 6, simulating the vaginal opening.

FIGS. 12-17 show a skeleton part 7 of the device of the present invention. This forms a part of the above mentioned internal organs. A dome shaped part 8 simulates the pelvis, including hip bones and pubic bones.

An elongate part 15 simulating the lower part of the spine extends from the pelvis 8. The spine will be explained in detail below.

The pelvis 8 is generally concave and a pelvic aperture 17 is defined in the bottom thereof. The pelvis 8 has on each side concave portions 9, 10 that are shaped to fit well against the thighs of an instructor wearing the simulator.

The spine 15 is hollow and accommodates a flexible blood container (not shown. The Blood container is preferably made of a transparent plastic sheet material. An opening of the blood container is welded, glued or in another suitable way fixed to a fill opening in the spine 15. A lid 70 is received by threads in the fill opening.

Figure 9:
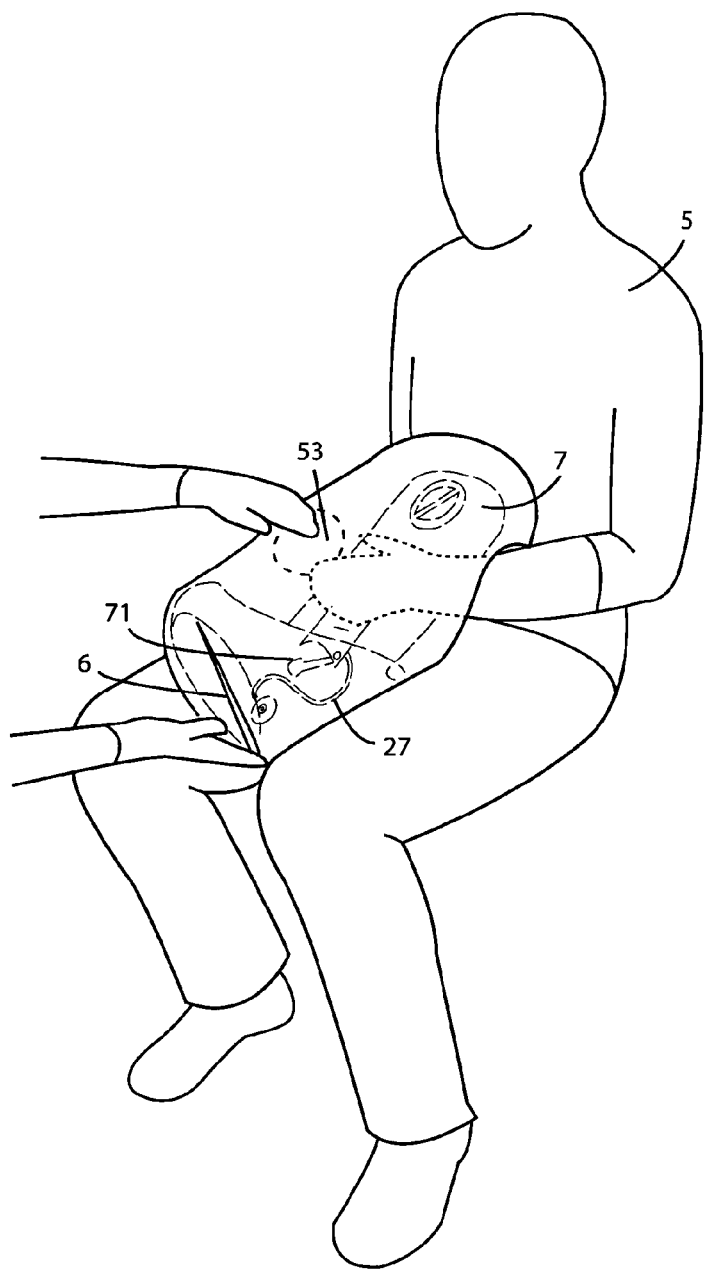
FIG. 9 shows the midwife/student checking the condition of the uterus.

A flexible tube 27 (see FIG. 9) extends from the blood container to within the vagina. The tube extends through a lever mechanism 71 (see FIGS. 16 and 17). The lever mechanism 71 comprises a lever 72 that is rotatable about an axis 73 and has a cam 74. The cam acts on a flexible arm 75. The arm in turn acts on the tube (not shown) from the blood container. With the lever mechanism 71 it is possible to pinch the tube from the blood container, so that the flow of blood through the hose can be adjusted from maximum to zero. The lever 72 interacts with three notches 76 in the lever mechanism 71 so that it can rest in the three positions fully open, half open and closed.

In addition to the blood container, there is also a urine container 36. This is situated at the inside of the top/front of the pelvis 8. This position is advantageous as it will be a high point of most birth positions and therefore ensure that the simulated urine inside the urine container will flow out of the container when catheterization is performed. The urine container is also preferably made of a transparent flexible plastic sheet material.

The position at the inside of the pelvis 8 also protects the urine container 36 against damage.

The urine container 36 is equipped with a valve mechanism 38. The valve mechanism 38 is of a type known per se that will open when a catheter is inserted. The opening of the valve mechanism is at the upper/front end of the vagina opening.

Figure 15:
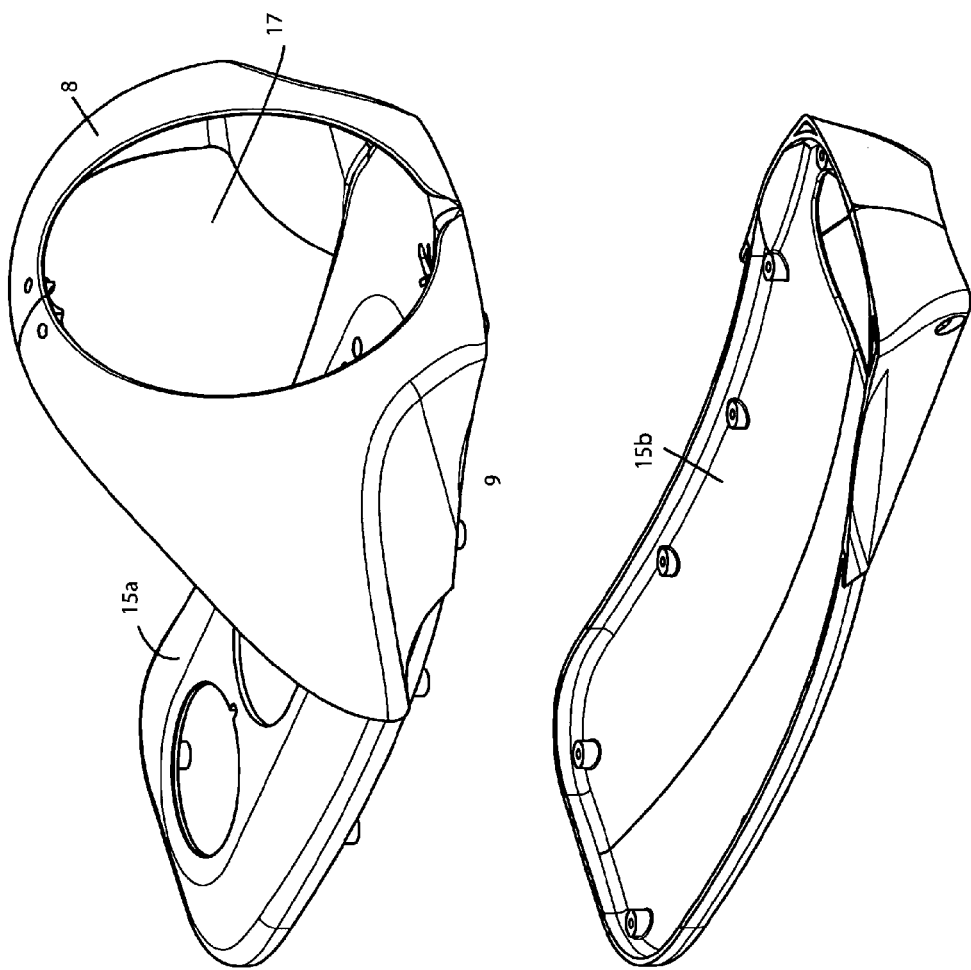
FIG. 15 shows the skeleton part divided into its two main components.
Figure 16:
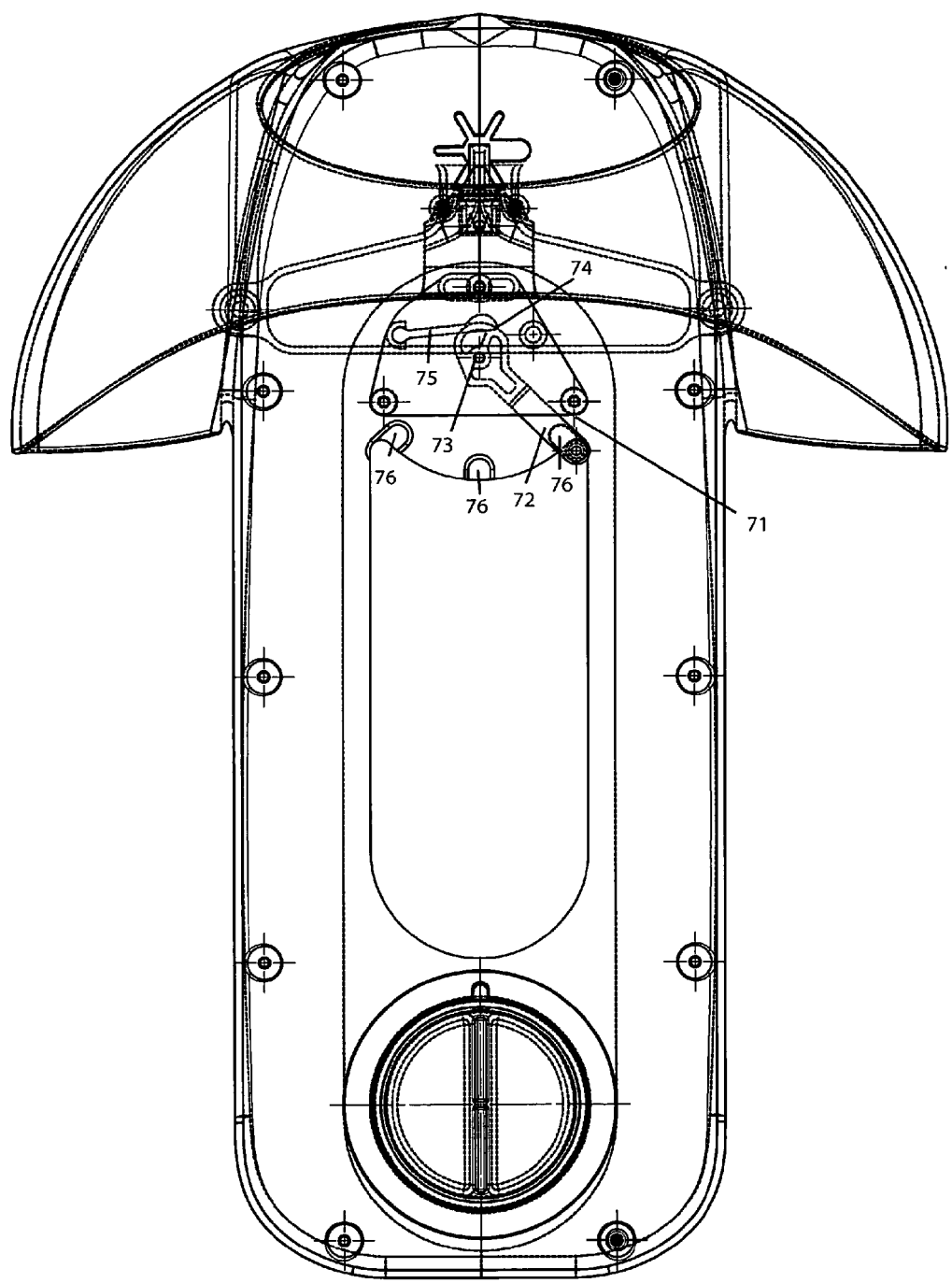
FIG. 16 shows the skeleton part and some of its internal components.
Figure 17:
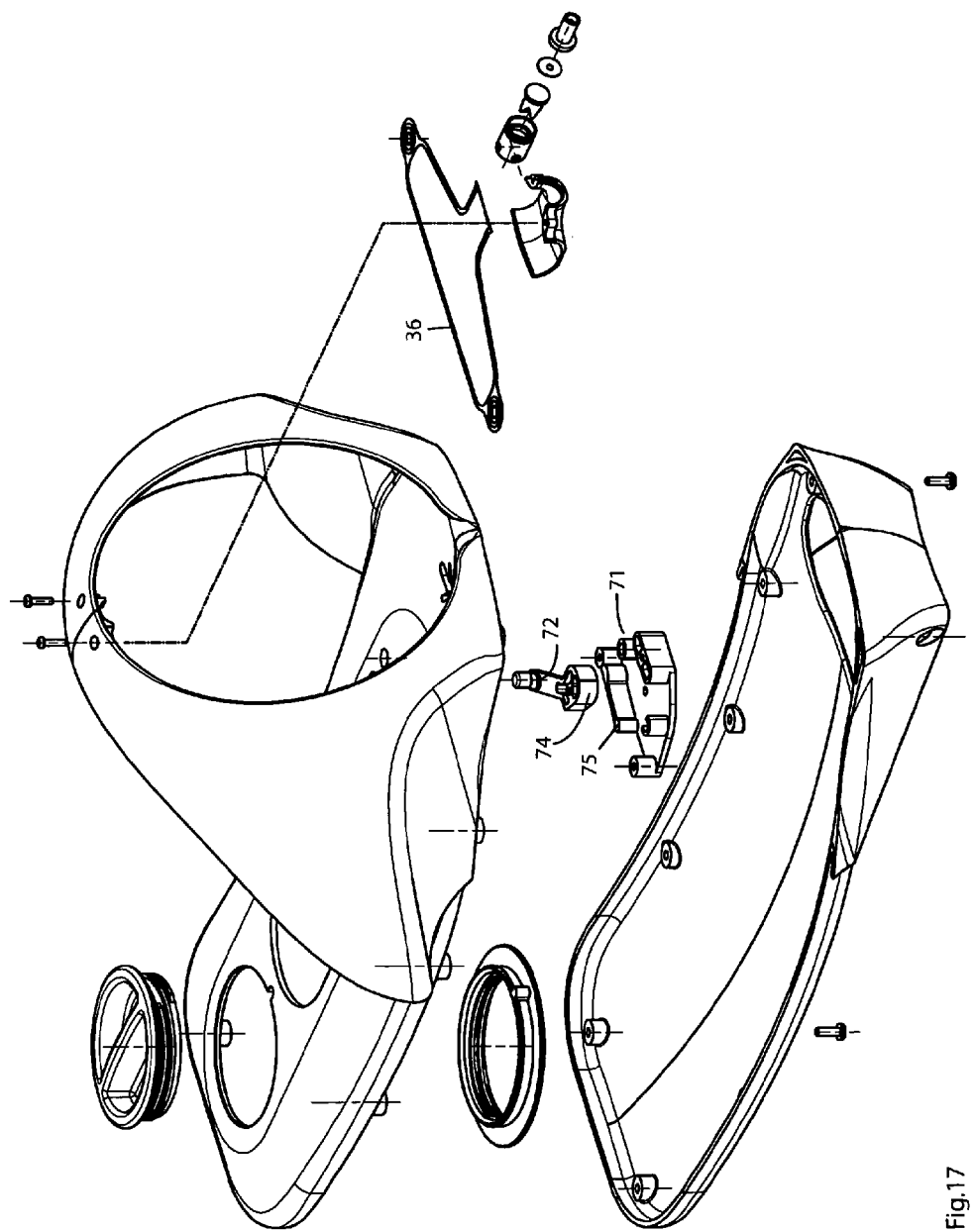
FIG. 17 shows the skeleton part in exploded view.

The skeleton part is moulded in two parts, as shown in FIG. 15; a ventral (front) part 15a comprising the pelvis 8 and a dorsal (back) part 15b. The two parts are snap-fitted together. The compartment for the blood container is formed between the two parts 15a and 15b.

The simulated uterus part 18 of the device of the present invention is shown in detail in FIG. 22. It comprises a ventral part 18a and a dorsal part 18b. Close to the posterior (lower end) the two parts 18a and 18b are connected by seams 19, leaving an opening 20 at the posterior end. The edge of the opening 20 is sewn to the edges of the vaginal opening 6 of the outer skin 1. At the anterior end the two parts 18a and 18b of the uterus 18 are equipped with a zipper 22. The zipper is adapted to close an insertion opening 23 for the foetus manikin 29.

At the edge of the opening 23 is also a strap 25 with a hook and loop system that can be used as an alternative means to close the opening 23 when it is desirable for the instructor to be able to reach into the uterus 18.

At the inside of the dorsal part 18b of the uterus 18 is a pocket 26 (in dotted lines) for placement of the placenta 80.

At the outside of the dorsal part 18b is also a pocket 28 (full lines). This pocket 28 has two slits 30, 31 through which a strap 56 for a uterus contraction simulator (see FIGS. 18 and 19). This will be explained in detail in connection with FIGS. 18 and 19.

The skin 1 and the uterus part 18 can be made from the same type of material. This can be a suitable web material of fabric, foil or other flexible sheet material. Preferably the material has some elasticity that simulates the elasticity of the real human tissue.

Near the posterior end of the uterus 18 are ribbons 82 (only one shown). These form handles for the mother when simulating labour, as will be explained below.

Close to the vaginal opening 20 is a ribbon 40 that can be tightened to restrict the expansion of the cervix and the vagina or to control the diameter of the cervix to simulate the cervix dilation that is the first stage of labour. The ribbon 40 extends around the cervix and has several punched out holes 41 that can be slipped onto a knob (not shown) on a buckle 42, so that the opening adjusted can be maintained without the need for the instructor to hold the ribbon 40. By selecting a different hole the cervical opening can be changed. The instructor can easily feel the holes and may count the holes to set the desired opening size.

A simulated placenta 80 is can be releasably attached to the inside of the uterus, e.g. by a hook and loop fastener, in order to withhold the placenta 80 in place after the delivery of the baby. The placenta is connected to the foetus by an umbilical cord 81. The fastening of the placenta is such that a pull in the umbilical cord 81 will free the placenta 80 from the uterus.

Figure 3:
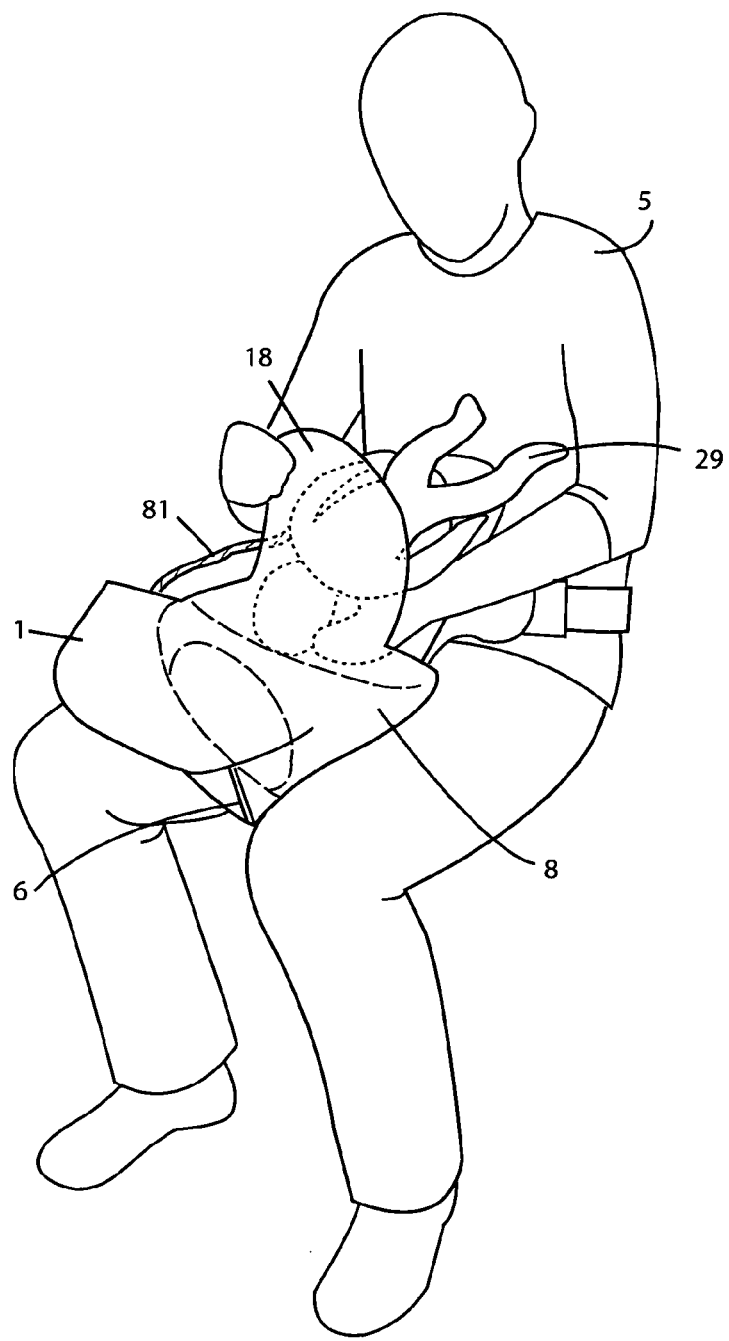
FIG. 3 shows the insertion of a foetus manikin into the uterus of the simulator.
Figure 4:
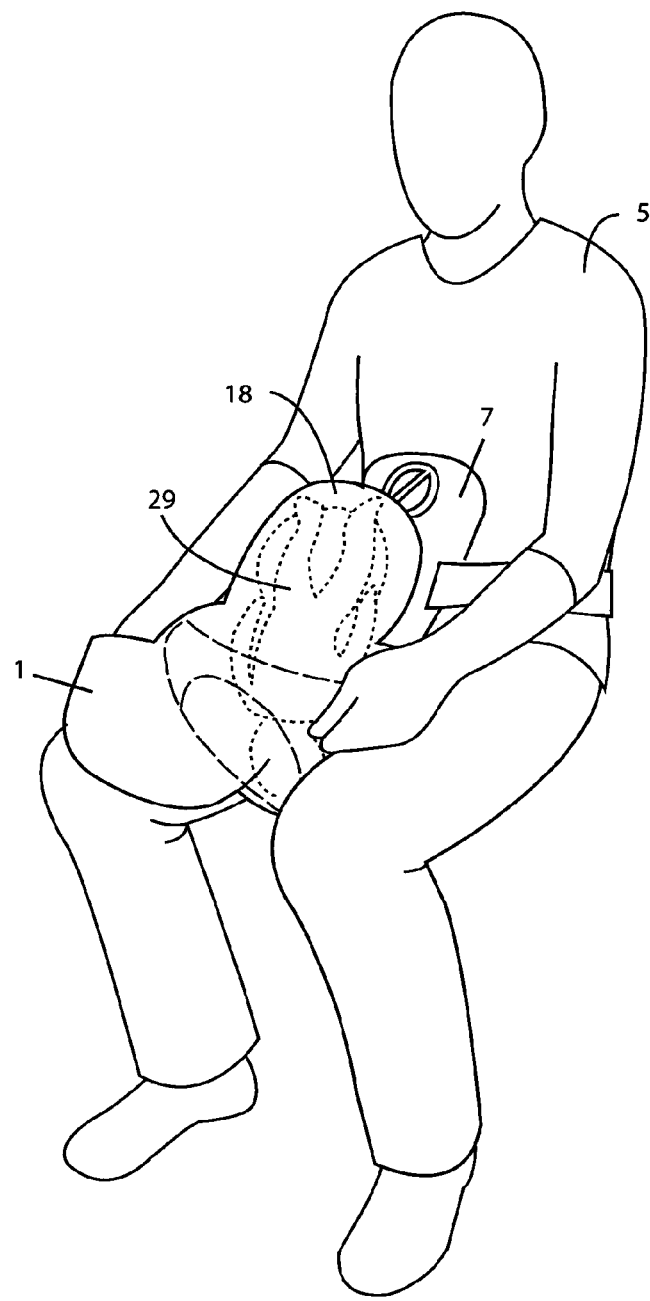
FIG. 4 shows the foetus manikin inside the uterus.

FIG. 3 shows the insertion of the foetus manikin 29 through the opening 23 into the uterus 18.

Figure 5:
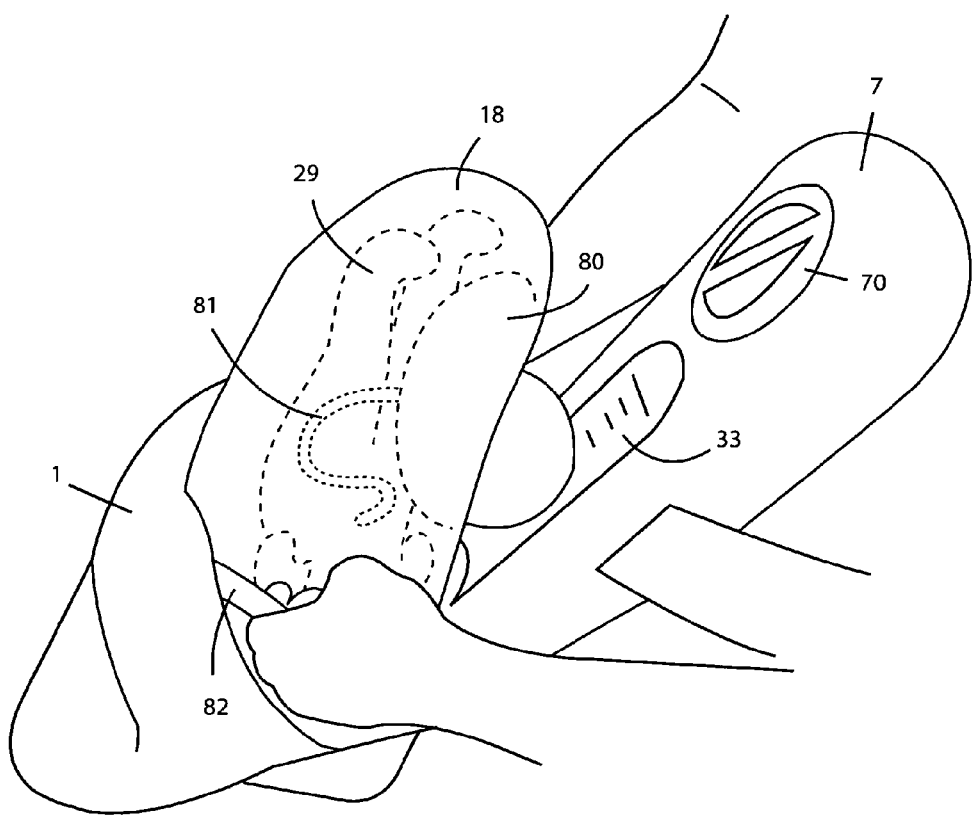
FIG. 5 shows the instructor gripping handle straps of the uterus.
Figure 6:
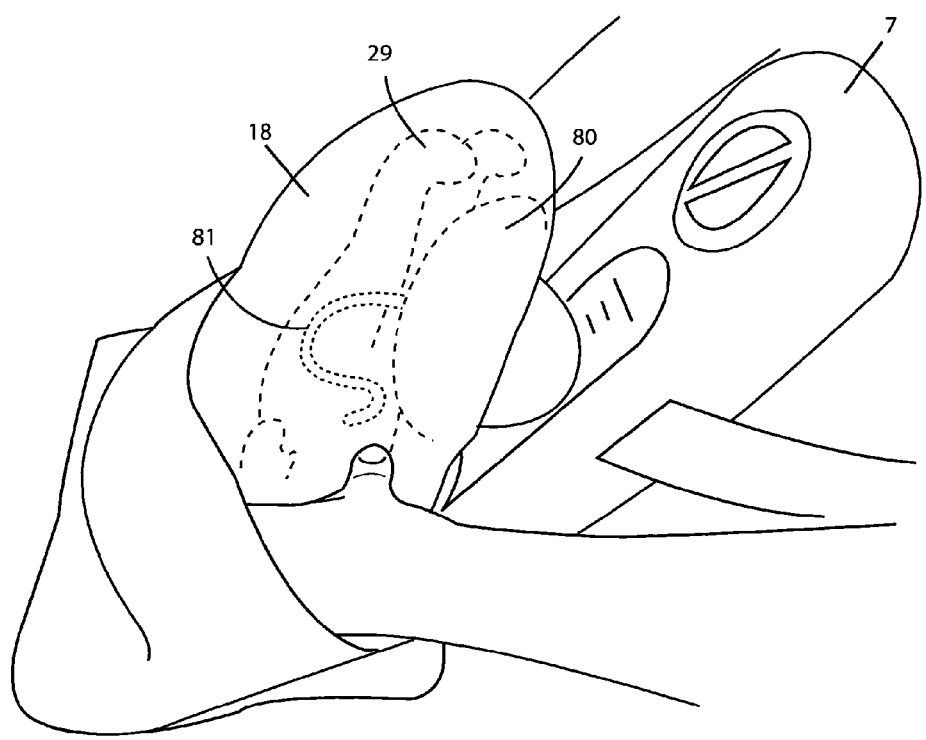
FIG. 6 shows the instructor pushing out the foetus manikin.

When the foetus manikin 29 has been fully inserted, the delivery may commence. As shown in FIGS. 5 and 6 the labour contractions are simulated by the mother 5 pressing on the uterus with her hands and thereby pushing the foetus manikin downwards towards and into the vagina. To facilitate this there are provided handles 82, e.g. straps, on the outside of the uterus 18. There may be one strap 82 for each hand. The mother can grip these straps 82 with the four fingers of both hands and press on the top of the uterus with the thumbs.

The cervix and vagina are made of an elastic material which will stretch under the pressure from the foetus manikin 29 and allow the foetus manikin to pass through. The circumference and elasticity of the cervix and vagina are adapted to simulate a real baby delivery. The foetus manikin 29 has a size and weight of the same magnitude as a real baby. This can be achieved by filling the baby manikin body with water or similar fluid.

After the baby has been delivered, the simulator may be used to simulate a variety of common complications. The mother may hold the placenta 80 to prevent the midwife from pulling it out, thus simulating a retained placenta.

The placenta may also have a part that can be taken off by the mother and retained inside the uterus. This simulates a condition where the placenta splits and a part of the placenta is not expelled.

In order to simulate bleeding the mother 5 may toggle the lever 72 to open up the flow of artificial blood from the blood container. This way the mother can adjust the bleeding to simulate various conditions. Through a window in the blood container compartment in the mother can watch the blood level in the container and thereby control the total amount of bleeding.

Figure 2:
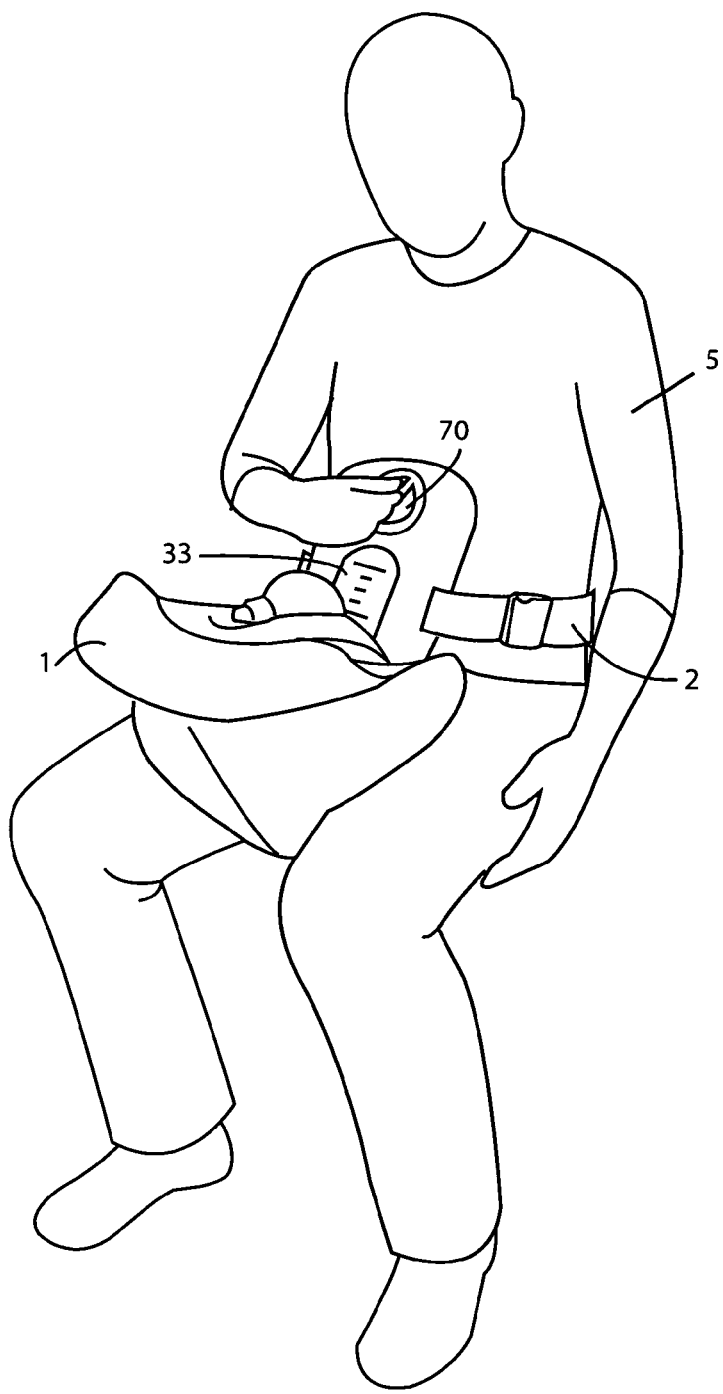
FIG. 2 shows the maternal simulator attached and the instructor being ready to fill the blood container.

A possible scenario of a birth may be as follows:

The simulator is attached to the mother 5 as shown in FIG. 1. The blood container 33, if not already filled with artificial blood, may be filled by unscrewing the cap 70 as shown in FIG. 2. The foetus manikin 29 is placed inside the uterus 18 as shown in FIG. 3 and also described above.

Figure 12:
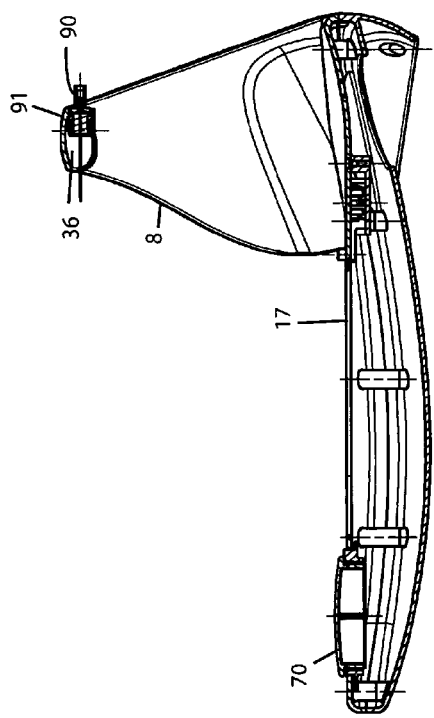
FIG. 12 shows a side cross section of the skeleton part of the simulator.
Figure 13:
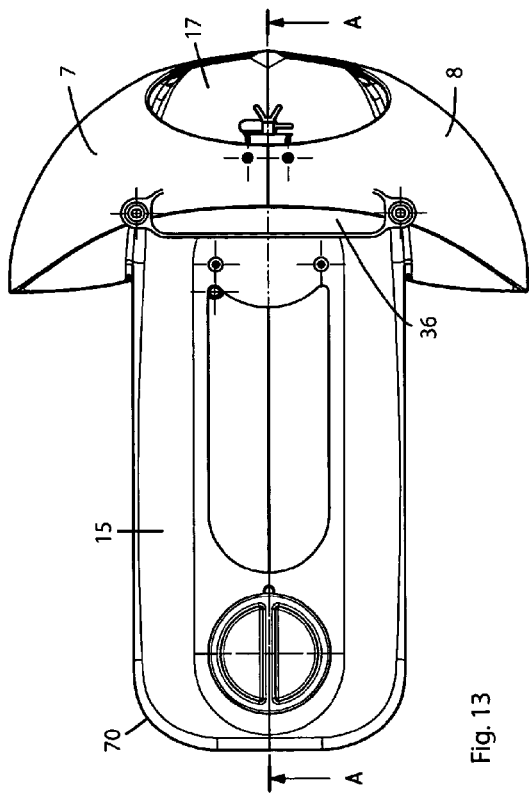
FIG. 13 shows the skeleton part of FIG. 12 in plan view.

Catheterization is performed by inserting a catheter (not shown) into the simulated urethra 90 (see FIG. 12). The catheter is inserted until it enters through the valve 91 in the urine container 36 and opens this. Thereby the simulated urine (which conveniently is plain water) runs through the catheter.

The labour is started by the mother 5 squeezing the uterus 18 in an intermittent fashion in order to simulate real labour. The mother may place the thumbs against the end of the uterus 18 furthest away from the vagina 20 and grip the straps 82 with the remaining fingers and use these as a lever to push on the foetus manikin 29 inside the uterus 18. For each squeeze the foetus manikin 29 is pressed further into the birth channel formed by the cervix and the vagina. The mother may fold the uterus 18 in order to increase the pressure on the foetus manikin 29.

By placing the foetus manikin the other way around a breech delivery can also be simulated. Other complications can also be simulated by choosing different positions of the foetus manikin 29.

Figure 7:
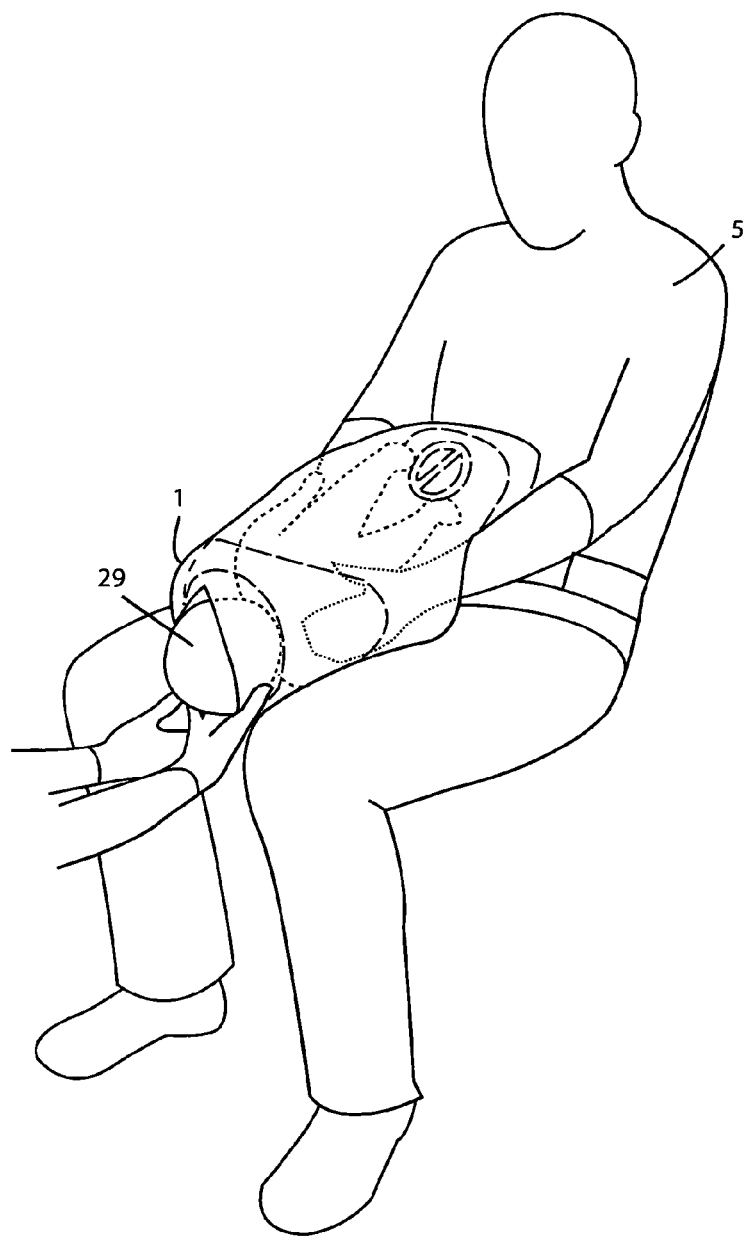
FIG. 7 shows head of the foetus manikin exiting the vagina of the maternal simulator, FIG. 8 the foetus manikin being delivered.
Figure 8:
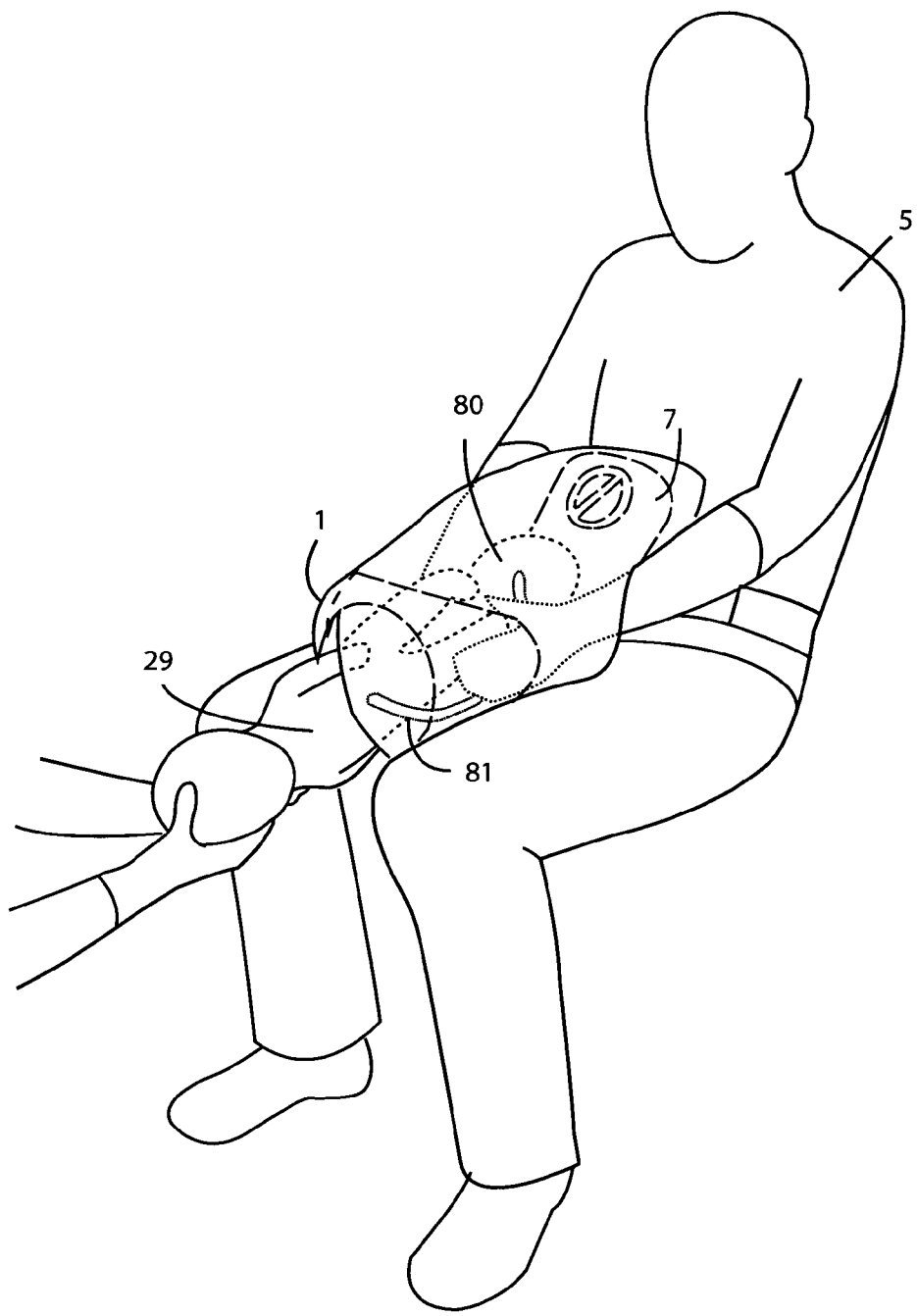

While the foetus manikin is being pressed through the birth channel the person being trained as a midwife can practice on receiving the baby, as shown in FIG. 7. When the foetus manikin, which now is better to call a baby manikin 29, has been pressed completely out, a cord 81 simulating the umbilical will extend from the baby though the vagina 20 and into the uterus 18. The inner end of the umbilical is fixed to a simulated placenta 80 (see FIG. 5) situated inside the uterus 18.

Mounting the placenta 80 to uterus 18 using hooks and loops simulates very well manual removal of the placenta, an operation where placenta is peeled off the inside of the uterus. It is also possible that the mother may withhold the placenta by hand. The placenta is preferably divided into two parts, so that a rupture and division of the placenta can be simulated, whereupon a part of the placenta remains inside the uterus. To this end the two parts of the placenta may be attached to one another by hook and loop fasteners. Preferably one part of the placenta is attached to the umbilical and the other part is withheld by the mother 5. This means that the mother 5 can decide to release the placenta so that the whole placenta follows the umbilical out, or retain a part of the placenta, whereupon only a part of the placenta 80 attached to the umbilical will be pulled out of the uterus.

The placenta preferably has a gel-like feel and appearance with hooks and loops or fabric on the side being mounted to the uterine wall.

It is also possible to simulate a trapped placenta (placenta accrete), when the placenta is unable to pass the cervix. The mother 5 can simulate this by manually restricting the opening of the cervix 21 or by holding back the placenta.

Placenta accreta is a very serious condition that may result in sever bleeding from the uterine wall and may also cause the mother to bleed to death. This condition can be simulated by the mother 5 opening the flow from the blood container 33 after the placenta 80 has been delivered, so that blood is flowing out of the tube from the blood container and out through the birth channel.

The simplest method of stopping this bleeding is to massage the uterus. At this point in time of the birth the uterus will normally have shrunk to a much smaller and compact size. This can be simulated by the mother 5 by the device described in detail in FIGS. 18-19, which will increase the tactile feeling of atonic and contracted uterus simulations. It is also possible to realistically simulate conditions between atonic and contracted state.

Figure 18:
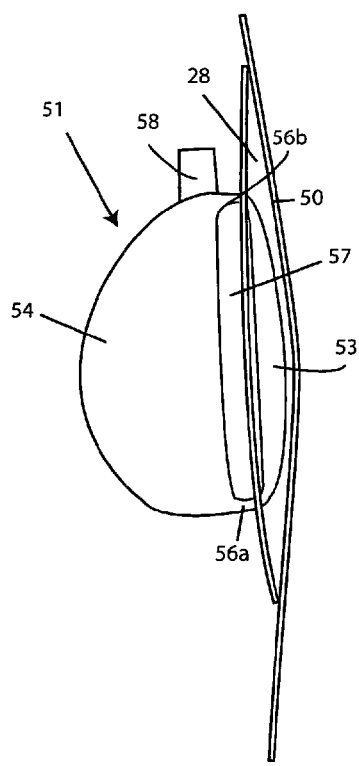
FIG. 18 shows a uterus contraction simulation device simulating an atonic uterus.
Figure 19:
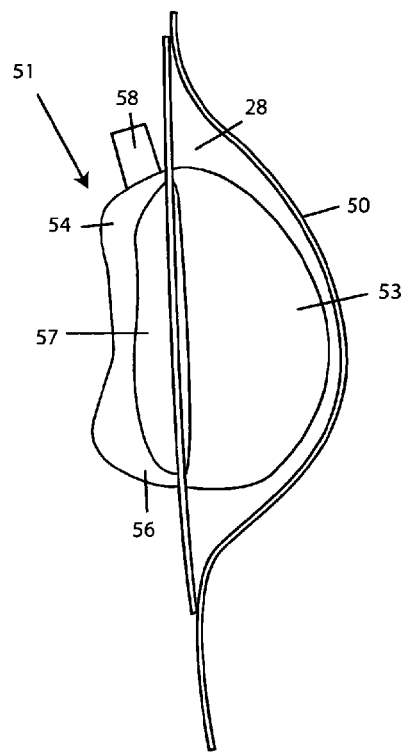
FIG. 19 shows a uterus contraction simulation device simulating a contracted uterus.
Figure 20:
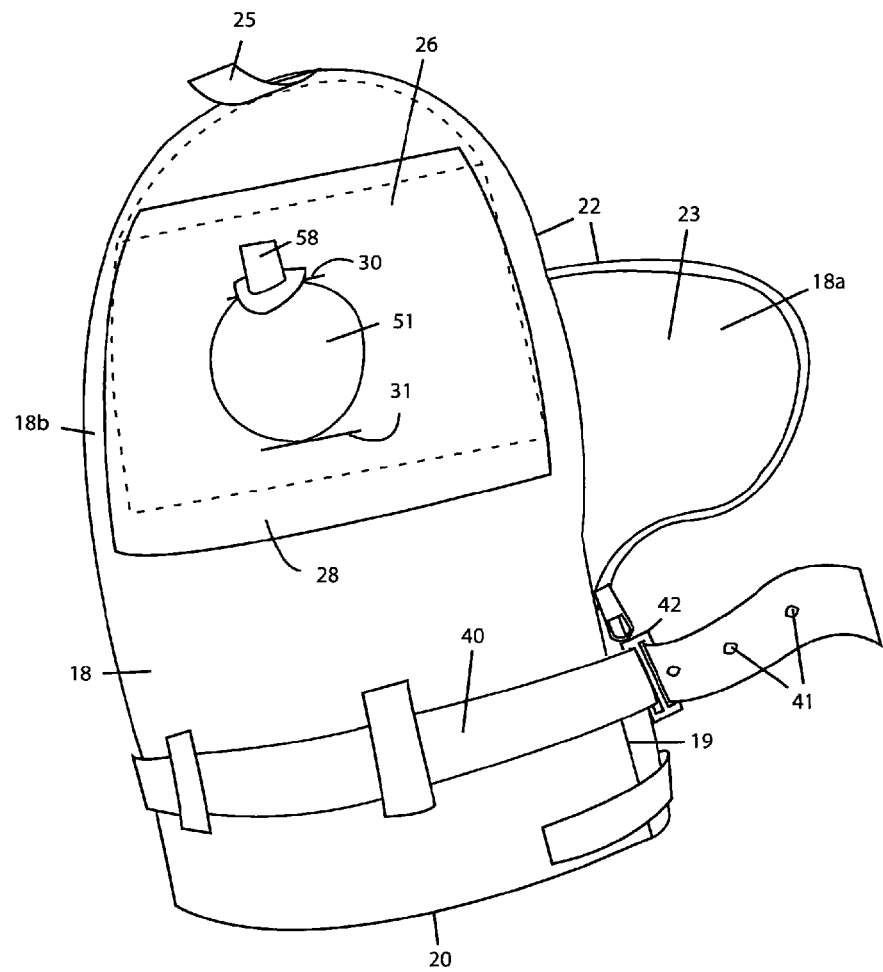
FIG. 20 shows the uterus part of the simulator.

FIG. 18 shows a cross section of the dorsal uterus wall 50 and simulates the uterus in atonic state. FIG. 19 shows a cross section of the dorsal uterus wall 50 and simulates the uterus in contracted state. Reference is also made to FIG. 20, showing the uterus with the contraction simulator 51 in dorsal plan view.

At the dorsal side of the uterus 18, i.e. opposite of the side facing the skin 1 is a pocket 26 containing a device 51 for simulating contractions. The device 51 comprises a first or internal flexible container 53 inside the pocket 28 and facing the dorsal uterus wall 50, and a second or external flexible container 54 outside the pocket 28. The external and internal containers are connected by flexible material strips 56a and 56b, which extends through the slits 30, 31 (see FIG. 20). The material strips may be a continuous strap or may be integrated with one or both of the containers. The two containers 53, 54 and the flexible strips 56a, 56b form an endless loop with a central opening 57. One or both of the strips 56a and 56b act as a fluid conduit, fluidly connecting the interior of the two containers 53, 54. Alternatively, a separate tube may extend between the two containers 53, 54

The two containers 53, 54 have approximately the same internal volume, but the external container 54 can also have a larger volume than the internal container 53. The two containers 53, 54 and the fluid conduit form a fluid tight system, which is filled with an amount of fluid constituting more than the internal volume of the internal container. The amount is however depending on the volume ratio between the internal and external containers. The fluid is preferably air or another suitable gas, but may also be a liquid, e.g., oil or water. The internal container has a fill inlet or valve 58 to fill the device 51 with the correct amount of fluid.

When the external container 54 is squeezed the fluid will flow through the conduit to the internal container 53 and inflate this. When the external container 54 is released, the fluid will flow back again to the external container, leaving the internal container 53 limp.

In atonic state the internal container 53 will not be completely deflated, as the amount of fluid in the system is adapted so that when the fluid is free to flow unobstructed, equilibrium is created that leaves the internal container 53 in a semi-filled state.

The instructor may put his/her hand into the opening defined by the two containers 53, 54 and the flexible strips 56a, 56b. This enables the instructor to squeeze the external container and move the contraction simulation device 51 to the correct position, using one hand only. This enables the instructor to toggle the lever 72 for adjusting the bleeding with the other hand.

The device 51 may also have a soft shield placed between the internal container 53 and the opening 57 so that the student does not feel the hand of the instructor when palpating the uterus from outside the skin 1.

In a contracted state the internal container 53 will be inflated to a relatively hard spherical state and press against the skin 1. The person training will then sense only the internal container 53 when he or she massages the uterus area. The instructor (mother) will place the device 51 in the right position and orientation to facilitate this simulation.

This device makes it possible to simulate an atonic uterus as a soft flat dome with a clear edge on the top and a contracted uterus as a hard padded sphere approximately 10 cm below an atonic uterus.

The device also makes it possible to simulate all conditions between the atonic state and the completely contracted state, enabling the person training to feel the result of the massage of the uterus as the uterus gradually contracts. Thereby it is possible for the instructor to give feedback on how the student is performing by contracting the uterus according to the efficiency of the massage. When the student performs productive massage, the instructor will squeeze the external container to inflate the internal container as well as move the uterus contraction simulation device 51 downward in the abdomen. At the same time the instructor will also gradually reduce the bleeding by closing the valve 71.

The spine 15 has openings so that the instructor can touch the flexible blood container to check how much blood is left. A thin plate can be placed over the blood container to make it easier for the instructor to press blood out of the blood container if a significant bleeding is to be simulated.

Figure 10:
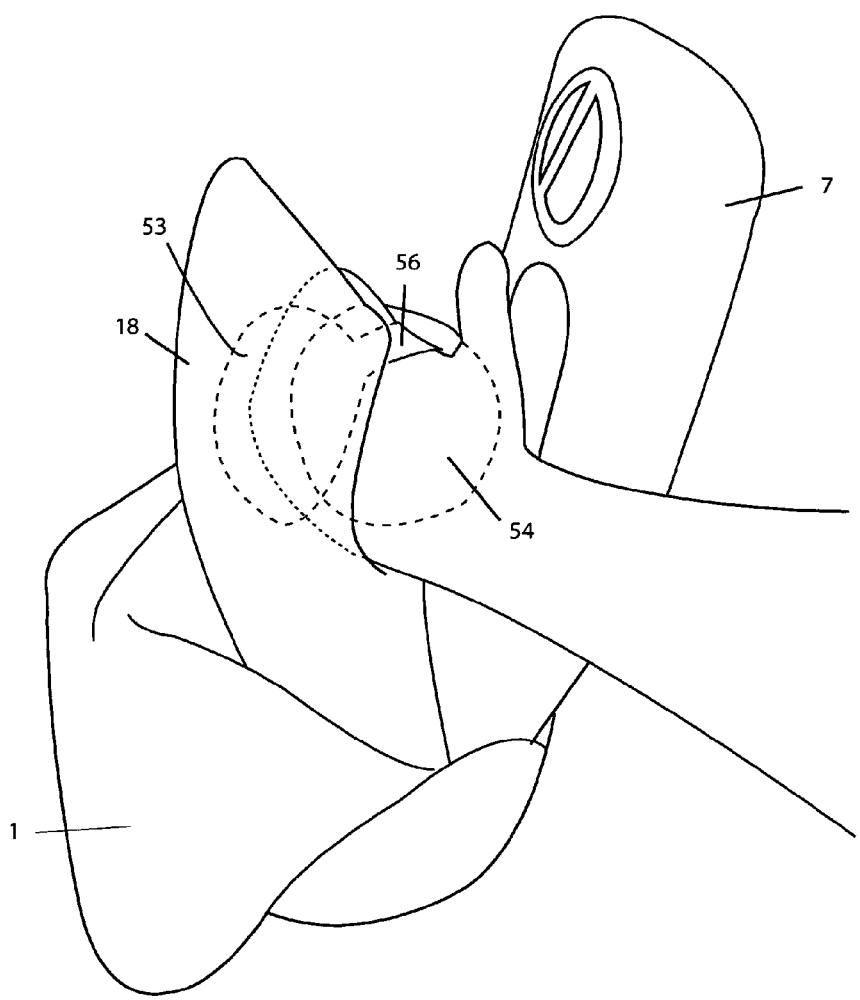
FIG. 10 shows a simulated uterus in atonic state.
Figure 11:
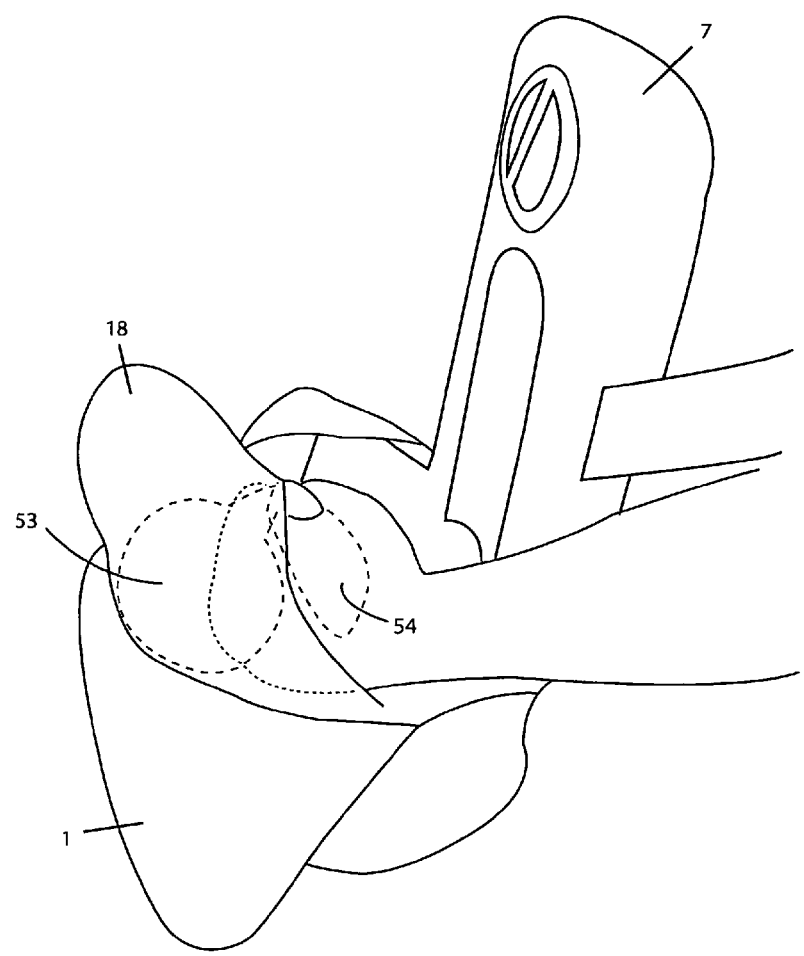
FIG. 11 shows the simulated uterus in contracted state.
Figure 14:
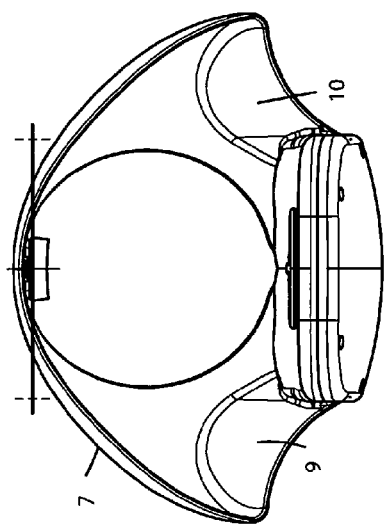
FIG. 14 shows skeleton part in end view.

FIG. 10 shows the device for simulation the uterus condition in atonic state. The instructor holds the external container in a position high up on the abdomen without squeezing the external container.

When a contracted uterus is to be simulated, the instructor squeezes the external container 54 and gradually moves it downward to the lower part of the abdomen. The midwife (student) may check the condition of the uterus by touching the abdomen (the skin 1 of the simulator) from the outside.

Figure 21A:
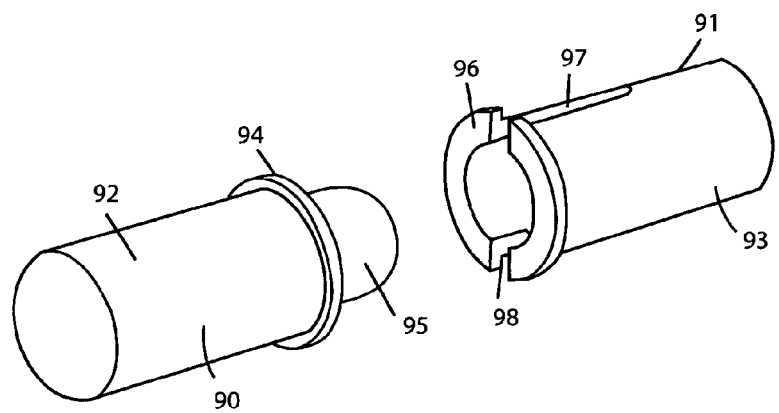
FIGS. 21a and 21b show a connector for the umbilical cord in separated and assemble conditions, respectively.
Figure 21B:
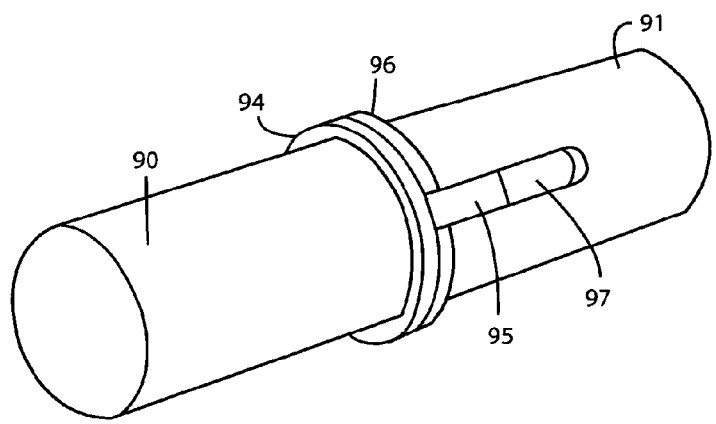

FIGS. 21a and 21b shows a snap fit coupling for the umbilical cord. It comprises two parts, a male part 90 and a female part 91. The two parts have a sleeve shaped section 92, 93 that are adapted to receive the end of a tube simulating an umbilical cord 81 (see FIG. 6). The connection between the tube and the sleeve section is made by a firm press fit or by the use of adhesive, welding or similar. At the opposite end the male part 90 has a flange 94 and a dome 95. The female part 91 has a flange 96 and a pair of slits 97, 98 extending into the sleeve section 93. There may be a small rib at the inside of the sleeve 93, that will grip behind the dome 95, which in turn has a portion of smaller diameter close to the flange 94.

When the dome 95 is inserted into the female part 91, as shown in FIG. 21b, the two parts will snap fit. Due to this snap fit, it is difficult to separate the two parts 90, 91 by an axial pull. However, if the two parts are bent relative to one another they will easily unsnap. Thereby the umbilical cord will not easily separate due to pulling on the cord during birth, but when it is desired to sever the umbilical cord from the newborn, this can be facilitated by bending and unsnapping the coupling 90, 91. The umbilical cord can thus be reused a great number of times.

In addition to having a connector 90, 91 on the umbilical cord 81 close to the foetus manikin 29, the umbilical cord may also be equipped with such a connector 90, 91 closer to the placenta 80 so that the student can practice pulling out of the placenta with the risk of the umbilical cord snapping.

Figure 22A:
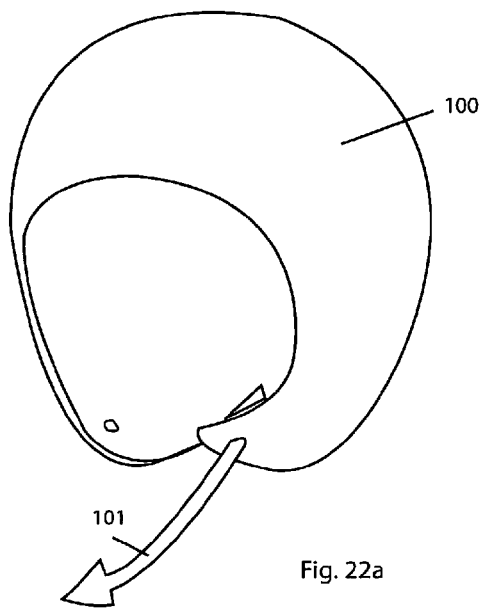
FIGS. 22a and 22b show a cap for the foetus manikin and the foetus manikin with the cap, respectively.
Figure 22B:
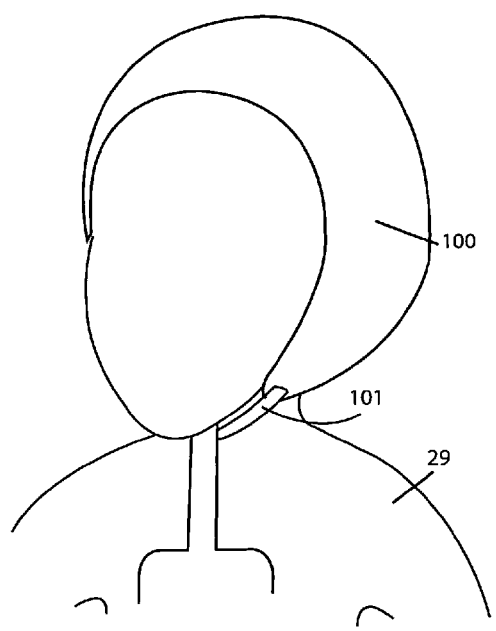

FIGS. 22a and 22b show a head cap 100 for a foetus manikin 29. Since the foetus manikin 29 is made of a relatively thin plastic foil material forming a compartment that is filled with a liquid, e.g., water, the skull is relatively soft and flexible. In order for the foetus manikin to have a more realistic skull, the manikin can be equipped with a harder cap 100. The cap 100 may also have softer parts simulating the fontanel areas of the skull. The cap 100 may be fastened with a simple strap 101.

Modifications to the simulator are also possible:

By including a zipper in appropriate place on the skin 1 and uterus 18 a cesarean section can be simulated.

By including a simulated aorta along the spine (skeleton part 7) compression of this to stop bleeding can be simulated.

It is also possible to simulate mounting of an intrauterine device by inserting an appropriately shaped object and attach it to the uterus by hooks and loops.

The uterus may also comprise a defined cervix attached to or formed unitary with the uterus, the cervix having a free edge situated within the vagina, so that a pocket is formed between the vagina and the cervix.

The invention claimed is:

1. A device for simulating birth and birth related complications, the device being adapted to be attached to a real human being, the device comprising:
   an outer skin with a simulated vaginal opening of a simulated vagina, the simulated vaginal opening being adapted to be situated adjacent a lower part of a person and the simulated vagina being disposed within the outer skin;
   a simulated uterus adapted to contain a foetus manikin, the simulated uterus having an opening coinciding with the simulated vaginal opening;
   a uterus simulator for simulating uterus conditions between a simulated atonic state and a simulated contracted state, the uterus simulator comprising a first inflatable container;
   a first conveyor for conveying simulated blood from a blood container to the simulated vaginal opening when the uterus simulator is in the simulated atonic state;
   wherein, in an inflated state, the first inflatable container simulates a tactile feeling of a contracted uterus to a user that touches the outer skin; and
   wherein, in a deflated state, the first inflatable container simulates a tactile feeling of an atonic uterus to a user that touches the outer skin.

2. The device according to claim 1 further comprising a skeleton part configured to simulate a pelvis and a portion of a spine, the pelvis including a pelvic opening; and
   wherein the simulated uterus is positioned within the pelvis and extends through the pelvic opening.

3. The device according to claim 2, wherein a portion the skeleton part is hollow; and
   wherein the blood container is situated within the hollow portion of the skeleton part.

4. The device according to claim 1, further comprising a cervix attached to or formed unitary with the simulated uterus, the cervix having a free edge situated within the vagina; and
   wherein the vagina and the cervix form a pocket between one another.

5. The device according to claim 1, further comprising a second conveyor for conveying simulated urine from a urine container to an outlet close to the simulated vaginal opening.

6. The device according to claim 5, wherein the second conveyor further comprises an urethra adapted for practice of catheterization by inserting a catheter into the urethra, and that the second conveyor or the urine container has a valve adapted to open when the catheter is inserted.

7. The device according to claim 5, further comprising:
   a skeleton part configured to simulate a pelvis and a portion of a spine, the pelvis including a pelvic opening;
   wherein the simulated uterus is positioned within the pelvis and extends through the pelvic opening; and
   wherein the urine container is situated within the pelvis close to a ventral side of the pelvis.

8. The device according to claim 1, wherein the first inflatable container is fluidly connected to a second flexible container so that a fluid can be transferred from the second flexible container to the first inflatable container by squeezing the second flexible container.

9. The device according to claim 8, wherein a soft shield is situated between the first inflatable container and a hand of an instructor when the instructor grips the second flexible container.

10. The device according to claim 8, wherein an amount of the fluid is adapted to fill a volume of the first inflatable and second flexible containers, so that when the second flexible container is squeezed it is possible to force enough fluid to the first inflatable container to inflate it into a relatively hard state, and when the second flexible container is not squeezed, the first inflatable container has a remaining fluid amount resembling at least a part of an atonic uterus.

11. The device according to claim 10, wherein the first container is contained in a pocket attached to the simulated uterus.

12. The device according to claim 1, wherein an adjustable elongate constriction element encircles the simulated uterus close to the simulated vaginal opening.

13. The device according to claim 12, wherein the adjustable constriction element is a band with punched out holes.

14. The device according to claim 1, further comprising:
   a simulated placenta is situated inside the simulated uterus;
   an umbilical cord attached to the foetus manikin at a first end and the simulated placenta at a second end; and
   wherein the umbilical cord is equipped with a snap fit connector that is capable of withstanding a high axial pull but which can be easily separated by bending the connector.

15. The device according to claim 1, wherein the foetus manikin comprises:
   a body portion comprising a thin flexible material filled with a liquid; and
   a skull cap comprising a material that is harder than the thin flexible material.

16. A method of simulating birth related complications, the method comprising:
   attaching a maternal simulator to a frontal area of an abdomen of a user, the maternal simulator comprising at least one of a simulated uterus, a simulated vaginal opening, a blood container, a valve, and a uterus contraction simulation device;
   inserting a foetus manikin into the simulated uterus of the maternal simulator;
   moving the foetus manikin out of the simulated uterus and through the simulated vaginal opening;
   opening the valve to let simulated blood to flow from the blood container to the simulated vaginal opening;
   massaging the simulated uterus;
   squeezing the uterus contraction simulation device to gradually simulate a contracted uterus to allow a user to tactilely feel the contracted uterus through the outer skin; and
   operating the valve to limit the flow of the simulated blood as the contracted uterus is simulated.

17. A device for simulating birth and birth related complications, the device being adapted to be attached to a real human being, the device comprising:
   an outer skin comprising a simulated vaginal opening, the simulated vaginal opening being adapted to be situated adjacent a lower part of a person;
   a simulated uterus that contains a foetus manikin, the simulated uterus having an opening coinciding with the simulated vaginal opening;
   a first inflatable container associated with the simulated uterus for simulating a tactile feeling through the outer skin of an atonic state of a uterus when the first inflatable container is not inflated and a tactile feeling through the outer skin of a contracted state of a uterus when the first inflatable container is inflated;
   a skeleton part, wherein the skeleton part is shaped to simulate a pelvis and a portion of a spine; and
   a first conveyor capable of conveying simulated blood from a blood container to the simulated vaginal opening.

18. The device according to claim 17 wherein the simulated uterus is positioned within the pelvis and extends through a pelvic opening in the skeleton part.

19. The device according to claim 17, further comprising a cervix attached to or formed unitary with the simulated uterus; and
- wherein the vagina and the cervix form a pocket between one another.

20. The device according to claim 17, further comprising:
- wherein the first inflatable container is fluidly connected to a second flexible container so that a fluid can be transferred from the second flexible container to the first inflatable container by squeezing the second flexible container;
- wherein the contracted state of a uterus is simulated when the second flexible container is squeezed; and
- wherein the atonic state of a uterus is simulated when the second flexible container is not squeezed.

\* \* \* \* \*